(12) United States Patent
Moosmann et al.

(10) Patent No.: US 9,873,124 B2
(45) Date of Patent: Jan. 23, 2018

(54) CROSSFLOW IMPACT DEVICE

(71) Applicant: BÜHLER AG, Uzwil (CH)

(72) Inventors: Jürgen Moosmann, Berg (DE); Andreas Meile, Sirnach (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 14/909,769

(22) PCT Filed: Aug. 6, 2014

(86) PCT No.: PCT/EP2014/066930
§ 371 (c)(1),
(2) Date: Feb. 3, 2016

(87) PCT Pub. No.: WO2015/022251
PCT Pub. Date: Feb. 19, 2015

(65) Prior Publication Data
US 2016/0198696 A1 Jul. 14, 2016

(30) Foreign Application Priority Data
Aug. 13, 2013 (EP) .................. 13180267

(51) Int. Cl.
B02C 13/06 (2006.01)
A01M 17/00 (2006.01)
(Continued)

(52) U.S. Cl.
CPC .......... B02C 13/06 (2013.01); A01M 17/008 (2013.01); B02C 9/00 (2013.01); B02C 13/286 (2013.01)

(58) Field of Classification Search
CPC . A01M 17/00; A01M 17/008; B02C 13/1814; B02C 13/1835; B02C 13/2804; B02C 13/18
(Continued)

(56) References Cited

U.S. PATENT DOCUMENTS 1,547,385 A * 7/1925 Hadsel ............... B02C 13/1835
                                                                    241/275
1,941,923 A * 1/1934 Armour ............. B02C 13/2804
                                                                    241/191
(Continued)

FOREIGN PATENT DOCUMENTS

CN 102744122 A 10/2012
EP 0238398 9/1987
(Continued)

OTHER PUBLICATIONS

International Search Report Corresponding to PCT/EP2014/066930 mailed Oct. 20, 2014.
(Continued)

Primary Examiner — Richard G Davis
(74) Attorney, Agent, or Firm — Davis & Bujold PLLC; Michael J. Bujold

(57) ABSTRACT

A beating device (1) for inactivating insects in a pourable feedstuff or foodstuff, with a housing (2), which has at least one inlet opening (3) and at least one outlet opening (4) for the material to be treated. A drum (6) is arranged in the housing (2) and rotatably about an axis of rotation (5). A plurality of blade elements (9) of a first type extend approximately parallel to the axis of rotation (5) and have a beating surface (10) arranged between two end parts (7, 8) of the drum (8). The drum is partially (8) circumferentially surrounded by a wall (11) of the housing (2) and the at least one inlet opening (3) and the at least one outlet opening (4) are formed in the wall (11).

13 Claims, 6 Drawing Sheets

(51) Int. Cl.
*B02C 9/00* (2006.01)
*B02C 13/286* (2006.01)

(58) Field of Classification Search
USPC .................................. 43/138, 142; 241/154
See application file for complete search history.

(56) References Cited

U.S. PATENT DOCUMENTS

| | | | | |
|---|---|---|---|---|
| 2,339,733 | A * | 1/1944 | Smith | A01M 17/008 241/188.1 |
| 2,339,735 | A * | 1/1944 | Smith | A01M 17/008 241/102 |
| 2,339,737 | A | 1/1944 | Hulse | |
| 3,102,781 | A * | 9/1963 | Hoskins | A01M 17/008 241/188.2 |
| 5,474,238 | A | 12/1995 | Reichmuth | |
| 6,334,327 | B1 * | 1/2002 | Fujiwara | B02C 13/08 241/194 |
| 2002/0179754 | A1 * | 12/2002 | Zanden | B02C 13/1814 241/27 |
| 2008/0041992 | A1 * | 2/2008 | Hall | B02C 13/09 241/189.1 |

FOREIGN PATENT DOCUMENTS

| | | |
|---|---|---|
| EP | 0238398 A2 | 9/1987 |
| GB | 539883 | 9/1941 |
| JP | 61177547 A | 8/1986 |
| JP | 62282541 A | 12/1987 |
| JP | 2655751 B2 | 9/1997 |
| JP | 2004351325 A | 12/2004 |
| WO | 8900456 A1 | 1/1989 |
| WO | 91/11260 A1 | 8/1991 |

OTHER PUBLICATIONS

Written Opinion Corresponding to PCT/EP2014/066930 mailed Oct. 20, 2014.
www.entoleter.com/impactfg.htm, ENTOLETER LLC, "Food and Grain Impact Milling", at least as early as Jan. 2016.
H. Zwingelberg et al., "Auswirkungen der Prallbehandlung auf die Verarbeitungsqualitat von Getreide und -Mahlerzeugnissen", at least as early as Jan. 2016.
Von Muhlening et al., "Die Qualitat von Getreide und -mahlerzeugnissen beim Einsatz von Prallmaschinen zur Schadlingsbekampfung", Heft 17, 125, Jahrgand 21, pp. 222-224, Apr. 1988.
B. Tognazza, "Der Einsatz von Prallmaschinen zur Stabilisierung von Mahlprodukten", Die Muhle + Mischfuttertechnik, Heft 32, 122, Jahrgang 8, pp. 429-431, Aug. 1985.
Korean Office Action issued in corresponding Korean Patent Application No. 10-2016-7006531 dated Nov. 21, 2016.
Japanese Office Action issued in corresponding Japanese Patent Application No. 2016-533891 dated Dec. 12, 2016.

* cited by examiner

CROSSFLOW IMPACT DEVICE

The invention relates to an impact device and to a method for the inactivation of insects in a pourable feedstuff or foodstuff.

"Pourable feedstuffs or foodstuffs" in terms of the present invention are to be understood as powdery and granular feedstuffs and foodstuffs and mixtures thereof, in an even more preferred manner grain, milling products such as flour, semolina, middlings, starch etc. where an infestation of insects in undesirable.

"Insects" in terms of the present invention are to be understood as insects which are in any stage of development, such as, for example, insect larvae, chrysalises, adult insects and in particular insect eggs, and are situated in the pourable feedstuff or foodstuff.

"Inactivation" in terms of the present invention is to be understood in particular as the killing of insects and in particular of insect eggs. Killing, however, is not absolutely necessary. The insects can also be damaged in such a manner that they die off shortly after leaving the device according to the invention or after the method according to the invention has been carried out. The important point is that the insects are no longer able to infest the treated feedstuff or foodstuff.

Devices of this type are known, for example, from WO 91/11260 of the Applicant, Buhler AG-CH 9240 Uzwil, and are used for the inactivation of insects and in particular insect eggs which are usually in a similar size range as the feedstuff or foodstuff (as a rule between 0.08 mm and 0.6 mm), comprise a three-dimensional form which is also similar to the feedstuff or foodstuff (as a rule oval) and consequently are not able to be separated from the feedstuff or foodstuff, e.g. using a separator.

As can be seen in FIGS. 5 to 8 of WO 91/11260, the feedstuff or foodstuff to be treated (referred to below as the product to be treated) is fed to the impact machine axially (40) in the region of the rotational axis of an impact plate and is then deflected by the rapidly rotating impact plate and accelerated radially (41) outward.

In this case, the product to be treated runs through the region of the impact plate in which a plurality of impact pins with a round cross section are realized. Insects which are situated in the product to be treated and are very easily damaged, also run through said region and are in this case caught by the impact pins and destroyed by the energy of the impact.

The treated feedstuff or foodstuff (referred to below as the treated product) is then trapped by a wall of the housing and then flows along the same until it reaches an outlet opening, which is arranged tangentially with respect to the impact plate, and leaves the impact machine.

Such an impact machine, however, is unsatisfactory in many respects, in particular because it is not able to be adapted to the requirements of a user in a simple manner.

To increase throughput, an impact machine with a larger diameter impact plate has to be provided as, on account of the axial-radial deflection of the product, axial elongation of the impact machine is only expedient to a limited extent. With regard to an increase in the diameter of the impact plate, however, there are limits set, in particular because the additionally necessary driving power is not commensurate with the increase in throughput. As a result, one or several, impact machines are connected in parallel to increase the throughput.

Such an impact machine cannot be designated as optimum fluidically either. On account of the product being redirected in an axial-radial manner and on account of the development of the impact pins, a turbulent flow is created which increases the average dwell time of the product in the impact machine. This, in turn, influences the grain size distribution of the product which should, however, remain as unchanged as possible.

It is consequently the object of the invention to provide a device and a method of the type named in the introduction which avoid the recognized disadvantages and in particular are able to be adapted to the requirements of a user in a simple and cost-efficient manner.

The device according to the invention and the method according to the invention should also improve the flow properties, not alter the grain size distribution in a significant manner, simplify the process design and nevertheless ensure a reliable and almost total inactivation of insects.

Said object is achieved with the features of the independent claims.

The first type blade elements extend approximately parallel to the rotational axis of the drum between the two end parts. However, deviations from the parallelism that occur during production are possible. It can also be provided that the first type blade elements comprise a curvature in such a manner that the radial spacing to the rotational axis on the end regions of the first type blade elements facing the end parts is greater than the radial spacing to the rotational axis in the center of the first type blade elements. Consequently, a widening of the drum during operation brought about by centrifugal forces is able to be countered.

The impact face of a blade element is to be understood as the face on which the impact between the product to be treated and the insects occurs when the device according to the invention is operating.

The at least one inlet opening and the at least one outlet opening are arranged according to the invention in a wall of a housing which surrounds the drum in a circumferential manner in part—i.e. apart from the regions where the inlet opening and the outlet opening are arranged. The wall consequently forms a type of casing for the drum.

As a result of the shaping of the drum with two end parts and one open lateral surface, which is permeable to the product to be treated, and of the arrangement of the at least one inlet opening and of the at least one outlet opening, which make it possible for the product to be fed and removed in a substantially radial manner, the product to be treated runs twice through the first impact zone which is formed by the first type blade elements.

The flow properties of the product to be treated are less turbulent than in the case of devices according to the prior art on account of not redirecting the product in an axial-radial manner. As a result, the average dwell time of the product to be treated can be reduced, which on the one hand results in a better process design, on the other hand does not significantly alter the grain size distribution. Feeding and removing the product in a substantially radial manner also enables better adaptation of the device to the desired throughput by the drum being elongated, where required, in the axial direction. Consequently, energy savings are also possible when operating a device according to the invention, in particular in the case of very high throughputs.

In a further preferred manner, the at least one inlet opening and the at least one outlet opening are arranged offset to one another with reference to the rotational axis by more than 90° and less than 270°, preferably by approximately 180°.

Consequently, a substantially rectilinear progression of the product, at least with reference to the housing, is made possible, as inside the drum the product describes a quasi arcuate path on account of the impact operation without experiencing the axial-radial deflection of the devices according to the prior art that is fluidically undesirable.

The first type blade elements preferably comprise a substantially flat impact surface. A substantially flat impact surface is to be understood as an impact surface which is able to deviate from a perfect flat surface as a result, for example, of a slight curvature or a structuring of the surface. The impact method and consequently the flow properties of the product to be treated can be improved even further as a result of the substantially flat impact surface. In a preferred manner, the impact surface comprises a width—i.e. a spatial extension transversely with respect to the rotational axis—of between 5 mm and 25 mm, in an even more preferred manner of between 10 mm and 20 mm.

In a further preferred, manner, the first type blade elements comprise a substantially rectangular cross section. This does not rule out, for example, the edges of the first type blade elements being able to comprise a rounding or chamfer. Consequently, simple production of a drum is made possible as standard profiles are able to be used.

The first type blade elements are fixedly connected, in particular welded, to the end parts. As an alternative to this or in addition to it, it is possible to incorporate the first type blade elements in correspondingly formed indentations and/or openings in the end parts and then to weld them or to fasten them in another manner, for example using known fastening means such as screws and the like. The drum is also able to be produced at least in part as a result of mold casting. Depending on the dimensioning of the drum, it can also be provided that the first type blade elements are only fixedly connected to one of the two end parts, in particular to the end part that is arranged on the drive side.

In an even more preferred manner, the first type blade elements extend in a substantially rectilinear manner between, the two end parts. It is also conceivable for the first type blade elements to comprise at least in part a helical or spiral development in the axial direction of the drum.

In an even more preferred manner, the impact surface of the first type blade elements is inclined between 0° and 45° with reference to the radius of the drum. This means that the plane, which defines or at least substantially characterizes the impact surface, for example because the impact surface is realized in a structured manner, is lightly curved or is chamfered or rounded at the edge, and a radius of the drum, which intersects the impact surface, form an acute angle with an angular distance of between 0° and 45°. In a still more preferred manner, said angular distance is between 0° and 10°.

Additionally preferred, the first type blade elements are arranged in such a manner that the impact surface points "downward"—i.e. is directed toward the rotational axis of the drum. The achievement of such an arrangement of the first type blade elements is that the flow properties of the product to be treated are improved even further by the impact with the impact surface being effected at an optimum angle both during feeding and removal. Nevertheless, the flow properties remain less turbulent than in the case of devices according to the prior art, resulting in the advantages already mentioned above.

Also additionally preferred, the first type blade elements are arranged radially at substantially identical spacings with reference to the rotational axis. The first type blade elements consequently rest on an imaginary lateral surface of a circular cylinder. In an even, more preferred manner, adjacent first type blade elements are arranged at substantially identical spacings from one another. Said preferred, realizations enable a substantially constant throughput of the product to be treated, over the entire circumference of the drum without product dust forming in the region of the inlet opening and/or of the outlet opening and/or inside the drum.

An also additionally preferred embodiment of the invention provides that a plurality of second type blade elements, which extend approximately parallel to the rotational axis, are arranged between the end parts of the drum.

At this point it must be noted that the above-mentioned advantages that relate to the realizations and further realizations of the first type blade elements can also be applicable to the second type blade elements.

In a preferred manner, the second type blade elements also comprise both a blade face, which in a more preferred, manner is realized substantially flat and in an even more preferred manner is also able to serve as an impact surface, and an inclined face, wherein the blade face and the inclined face meet at an edge, preferably at a sharp edge which points in a direction of rotation of the drum. In a preferred manner, the blade face comprises a width—i.e. a spatial extension transverse with respect to the rotational axis—of between 5 mm and 25 mm, in an even more preferred manner between 10 mm and 20 mm. In an even more preferred manner, the width of the blade face of the second type blade elements corresponds substantially to that of the impact surface of the first type blade elements.

In a preferred manner, the second type blade elements comprise a substantially trapezoidal, in particular an orthogonally trapezoidal cross section. Said cross section can influence the flow properties of the product to be treated in a positive manner, in particular when the second type blade elements are arranged in the edge region of the drum.

In a preferred manner, the second type blade elements are produced from the same rectangular standard profile as the first type blade elements by an edge of the rectangular standard profile being machined to form a face that is tilted with reference to the surface area of the standard profile.

In an even more preferred manner, the second type blade elements extend in a substantially rectilinear manner between the two end parts. The second type blade elements, however, do not necessarily have to comprise the same progression as the first type blade elements. It can be provided, for example, that the first type blade elements extend with a helical or spiral development whilst the second type blade elements extend in a substantially rectilinear manner or vice versa.

In an even more preferred manner, the blade face of the second type blade element is inclined between 15° and 75° with reference to the radius of the drum. This means that the plane, which defines or at least substantially characterizes the impact surface, for example because the impact surface is realized in a structured manner, is lightly curved or is chamfered or rounded at the edge, and a radius of the drum, which intersects the impact surface, form an angle with an angular distance of between 15° and 75°. In an even more preferred manner, said angular distance is between 40° and 60°.

Additionally preferred, the second type blade elements are arranged in such a manner that the impact surface points "downward"—i.e. is directed toward the rotational axis of the drum.

Additionally preferred, the second type blade elements are arranged radially at substantially identical spacings with reference to the rotational axis.

In a still further preferred manner, adjacent second type blade elements are arranged at substantially identical spacings from one another.

A still further preferred embodiment provides that the first type blade elements and the second type blade elements are arranged, in each case alternately in the circumferential direction of the drum. This means that when looking in the radial direction of the drum, i.e. onto the lateral surface, in each case one first type blade element is arranged between two second type blade elements and vice versa. Accordingly, the number of first type blade elements corresponds to the number of second type blade elements.

A ratio of in each case between 40 and 70 first type and second type blade elements per 1 m diameter of the drum is particularly preferred.

Also additionally preferred, the invention provides that the second type blade elements are situated radially outside the first type blade element with reference to the rotational axis. The product to be treated consequently passes from the region of the second type blade elements, where a treatment of the product can already take place, to the first type blade elements where it contacts the impact surfaces. As a result of the deflection occurring during the impact and as a result of the rotation of the drum, the product is centrifuged out of the drum and then flows along the wall of the housing in the direction of the output opening.

In this case, it can be provided in a preferred manner that the largest radial extension of the first type blade elements corresponds substantially to the smallest radial extension of the second type blade elements.

As a result of such a preferred arrangement of the first and second type blade elements, the basic principle or a cross-flow blower is applied in the case of the device according to the invention. The second type blade elements generate light suction such that the product to be treated passes into the housing and finally into the drum.

The drum, however, in contrast to a crossflow blower, has to avoid the air becoming too turbulent as otherwise the flow properties inside the drum become too turbulent and the average dwell time is increased. It is also important that in particular in the region of the inlet opening no air cushions are formed that prevent the product being supplied and in the worst case can compress the product in such a manner that it blocks a feed line.

The impact energy that is necessary for the inactivation of the insects is created substantially when bouncing onto the impact surface of the first type blade elements. The blade face of the second type blade elements, however, depending on the arrangement, can also enable the inactivation as a result of bouncing onto the blade face.

In an even more preferred manner, the wall of the housing which surrounds the drum in a circumferential manner comprises substantially the form of a lateral surface of a circular cylinder. Exceptions can be formed by the regions of the at least one inlet opening and of the at least one outlet opening which can be optimized fluidically, for example for avoiding the air and/or the product being stirred up or for removing the product in a better manner.

In an even further preferred manner, a gap width between the wall of the housing, which surrounds the drum in a circumferential manner, and the first type and/or second type blade elements which are situated radially outermost, is preferably between 5 mm and 20 mm, in an even more preferred manner between 10 mm and 15 mm.

The wall which surrounds the drum in a circumferential manner can be provided with wiper elements in the region of the at least one inlet opening and/or the at least one outlet opening. The wiper elements in the region of the at least one inlet opening are arranged in such a manner that the product to be treated moves into the drum and not into the gap between the drum and the wall. This consequently ensures that a product flow runs through the drum and is caught at least two times by the impact surfaces of the first and/or second type blade elements.

The wiper elements in the region of the at least one outlet opening are arranged in such a manner that the product that has now been treated is conveyed out of the housing. This consequently ensures that the product that has now been treated leaves the device and consequently the average dwell time is not negatively influenced.

The radial gap width, with reference to the rotational axis, between the wiper element and the first and/or second type blade element is preferably between 0.5 mm and 5 mm, in a more preferred manner between 1 mm and 3 mm.

To increase the stability of the drum, it is preferably provided that further reinforcement elements, which are connected to the first and/or second type blade elements and when operating counter a radial widening of the first and/or second type blade elements, are provided between the end parts.

The reinforcement elements are preferably realized as circular ring-shaped disks.

In a further preferred manner, the end parts are realized as substantially closed faces. This does not rule out the fact that openings can possibly be present, for example for flange-mounting a drive or for fastening the first and/or second type blade elements.

In a further preferred embodiment, the device according to the invention can also be operated in an installation with a pneumatic conveying system. In this case, it can be provided in a preferred manner that the rotational axis of the drum can be arranged not as in the usual manner horizontally but also vertically or inclined in an arbitrary manner.

The at least one inlet opening and the at least one outlet opening preferably extend substantially over the entire axial length of the drum. As an alternative to this, several inlet openings and/or several outlet openings can be provided which in an even more preferred manner also extend substantially over the entire axial length of the drum.

In an even further preferred manner, the axial extension, with reference to the drum, of the at least one inlet opening is smaller than the axial extension of the first and/or second type blade elements. In an even more preferred manner, said difference in the region of the end parts is in each case between 1 mm and 25 mm, in an even further preferred manner between 3 mm and 13 mm. Consequently, when the product to be treated flows into the device, it is prevented from passing into a gap between the respective end part and a housing end wall.

The diameter of the drum in the case of a preferred embodiment is between 300 mm and 600 mm. In this case, an axial length of between 60 mm and 600 mm is preferred, which makes possible a throughput of product to be treated of up to 50 tonnes per hour.

A rotational speed of the drum, depending on the embodiment, is chosen in such a manner that the impact surface of the first type blade elements and/or the blade surface of the second type blade elements comprises a circumferential speed of more than 60 m/s, in a preferred manner between 65 m/s and 85 m/s, in an even more preferred manner between 70 m/s and 80 m/s.

The device according to the invention provides in an even further preferred manner that at least two drums are connected together axially side by side to form a drum arrangement. In a preferred manner, the drums are flange-mounted next to one another on one of the two end parts. Consequently, a device according to the invention can be constructed in a modular manner. In addition, the housing can also be designed in a modular manner. By stringing drums and housing modules together, the length of the drum arrangement can consequently be adapted to the desired throughput.

The method according to the invention is characterized by feeding the product to be treated to a drum, which is provided with a plurality of impact surfaces and which rotates about a rotational axis, in a substantially radial direction with reference to the rotational axis.

The flow properties are less turbulent than in the case of a method according to the prior art on account of there not being any deflecting in an axial-radial manner.

The product preferably does not then leave the drum in an axial direction.

The invention additionally provides for the use of a crossflow blower rotor or of a crossflow-blower-like device for the inactivation of insects in a pourable feedstuff or foodstuff.

Any devices which enable product to be treated to be fed and removed in a substantially radial manner and in particular generate more or less pronounced suction of the product to be treated, can be used as a crossflow blower rotor.

The invention is explained better below by way of a preferred exemplary embodiment in conjunction with the drawings, in which.

Figure 5:
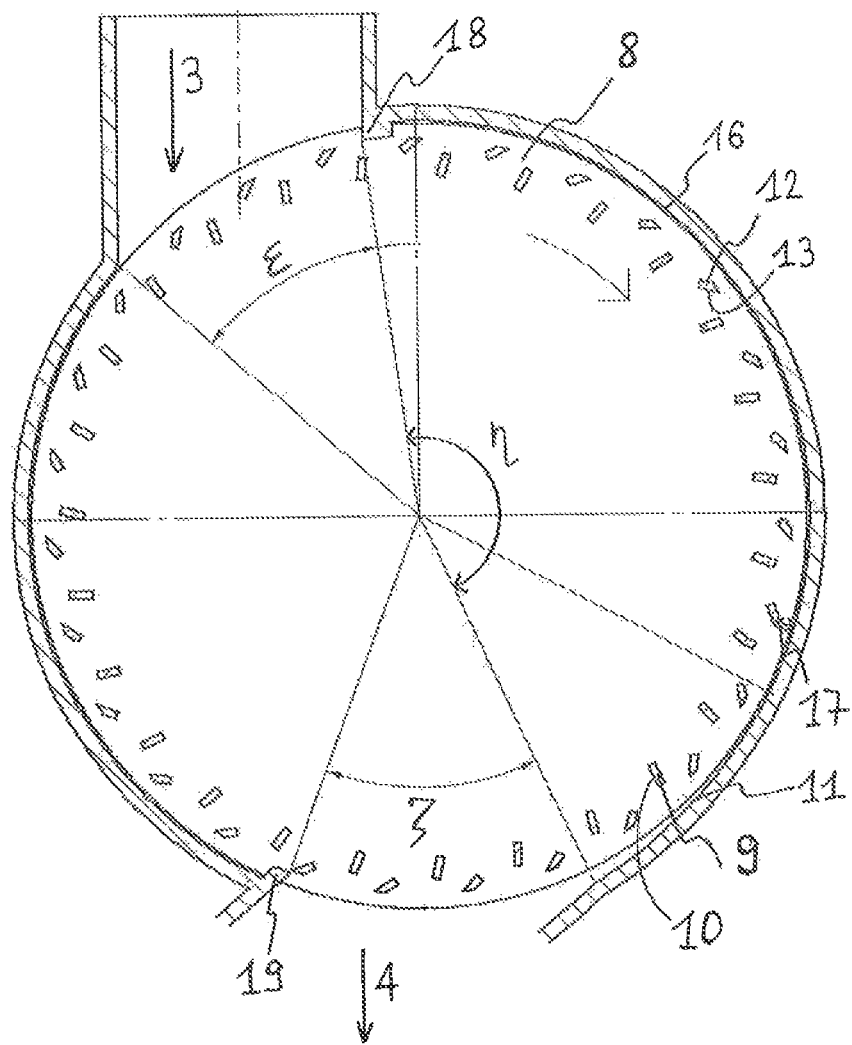
Figure 6:
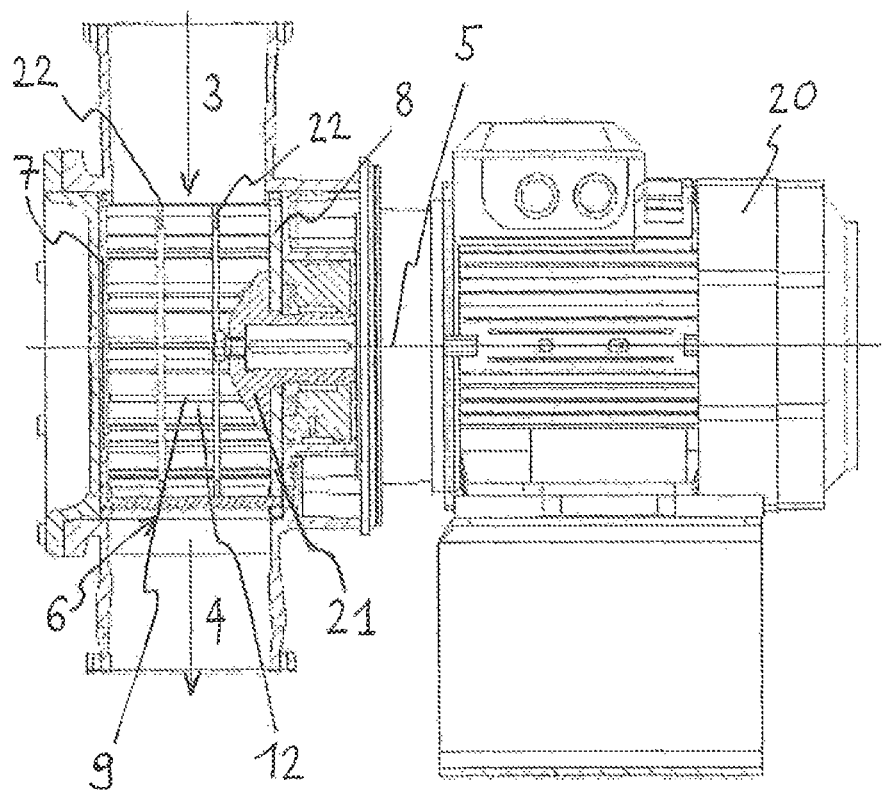

FIG. 5 snows a cross section through the drum and the housing of at second embodiment of the device according to the invention;

FIG. 6 shows a side view of a third embodiment of the device according to the invention with a flange-mounted motor, a sectional view of the device being shown.

Figure 1:
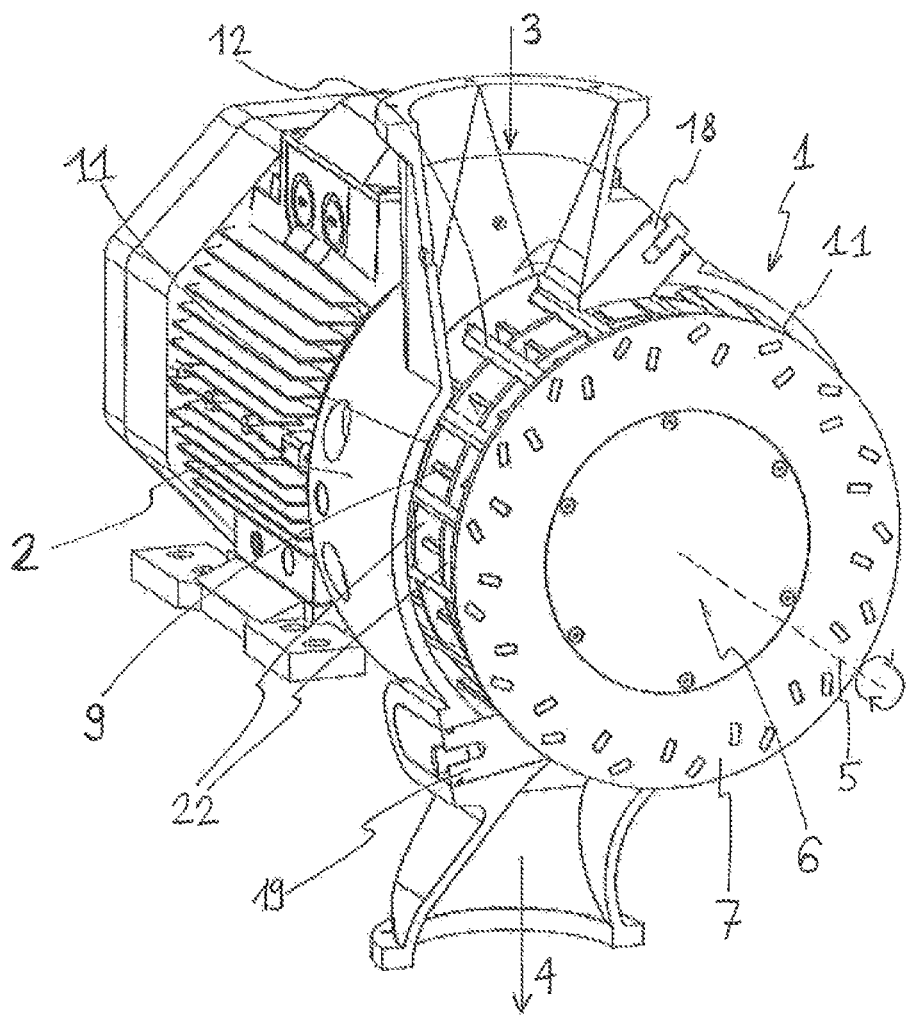
FIG. 1 shows a sectional view in perspective of a preferred embodiment of the invention with a flange-mounted motor.

FIG. 1 shows a device 1 which consists substantially of a housing 2 and a drum 6.

The housing 2 can be realized with one or multiple parts depending on the intended application.

For feeding and removing the product to be treated, the housing 2 comprises an inlet opening 3 and an outlet opening 4 which are shown schematically in each case by an arrow and extend substantially over the entire axial length of the drum 6.

In a preferred manner, the inlet opening 3 and the outlet opening 4 each comprise a substantially constant width over the entire axial length of the drum 6.

The drum 6 consists of two end parts 7 and 8, of which only the end part 7 can be seen in its entirety.

A plurality of blade elements 9 and 12 extend between the end parts 7 and 8, i.e. in the longitudinal direction of the arum 6, substantially parallel to a rotational axis 3 of the drum 6.

Figure 2:
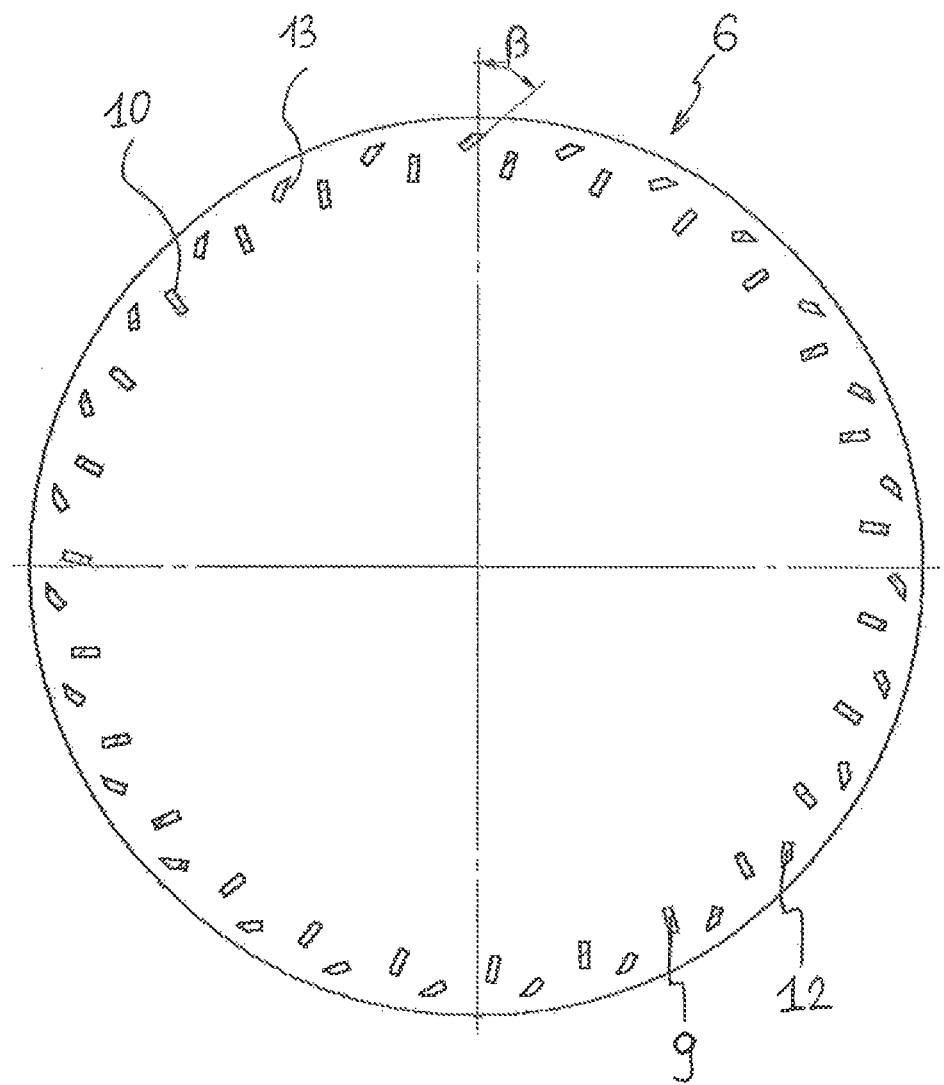
FIG. 2 shows a cross section through a drum of a second preferred embodiment of the device.
Figure 3:
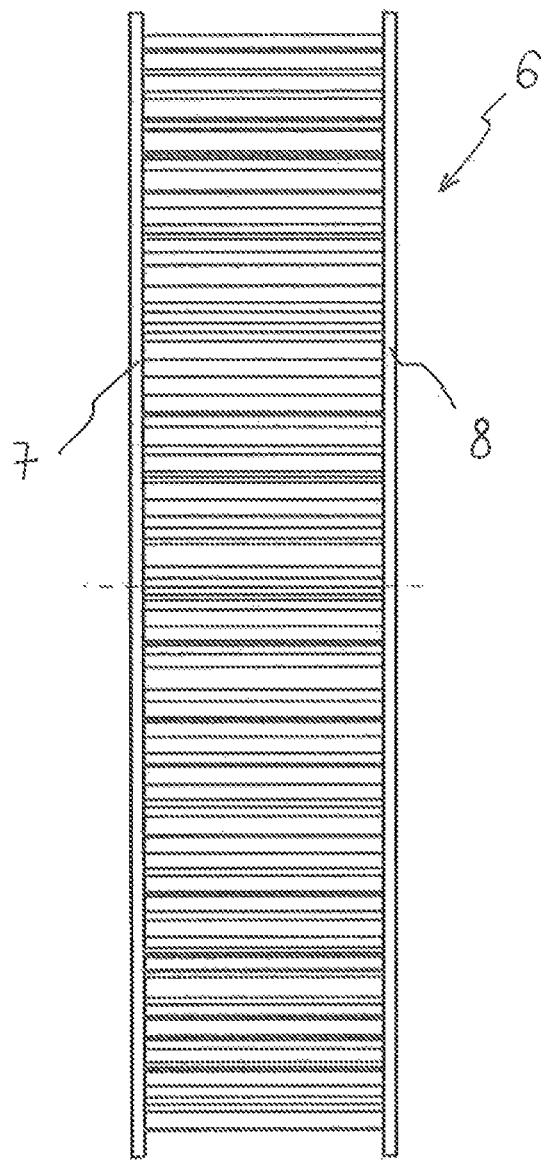
FIG. 3 shows a side view of the drum of FIG. 2.
Figure 4:
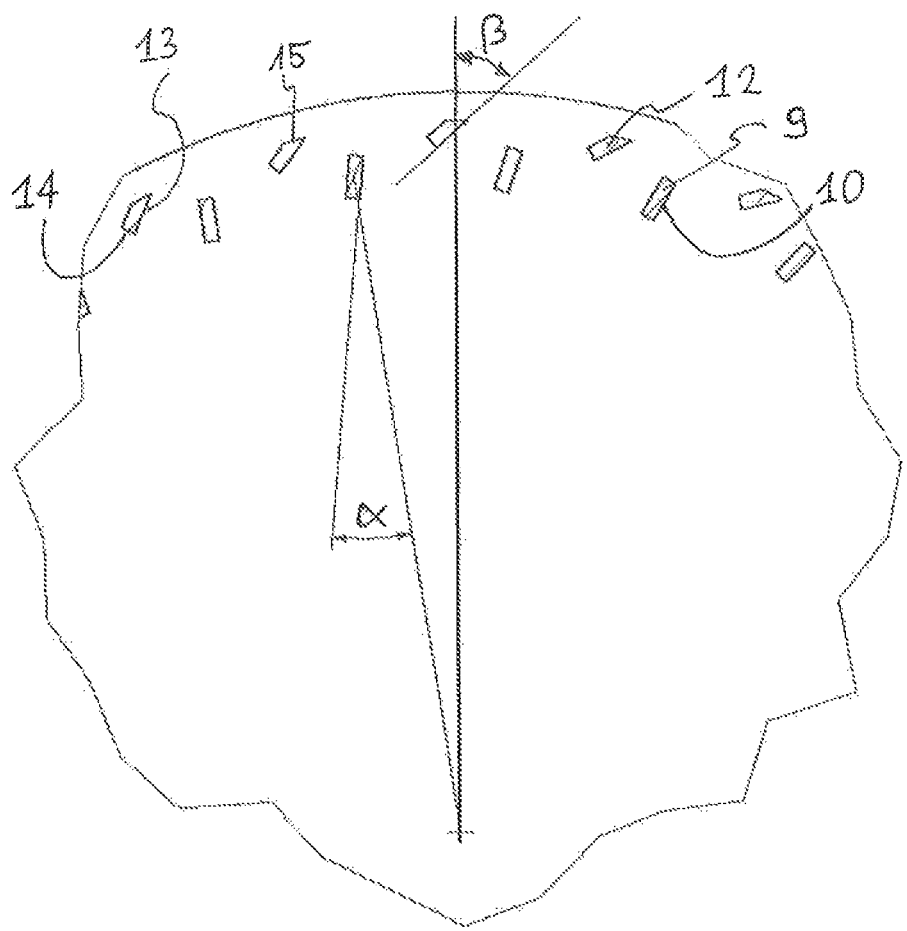
FIG. 4 shows a view of a detail of the blade elements.

Said blade elements can be seen better in FIGS. 2, 4 and 5.

There are two types of blade elements, namely first type blade elements 3 and second type blade elements 12, only some of which are provided with references for the sake of simplicity.

The first type blade elements 9 each comprise a substantially flat impact surface 10, are distributed regularly in each case about the circumference of the arum 6 and form a first blade region.

The second type blade elements 12 each comprise a substantially flat blade surface 13, are distributed regularly in each ease about the circumference of the drum 6 and form a second blade region. The second type blade elements 12 each also comprise a flat or arcuate inclined face 15, the blade face 13 and the inclined face 15 meeting at a razor-sharp edge which points in the direction of rotation of the drum.

First type blade elements 9 and second type blade elements 12 are arranged in each case in a concentric manner with the rotational axis 5 as the center, the second type blade elements 12, when viewed radially, being situated outside the first type blade elements 9.

The first type blade elements 9 comprise a substantially rectangular cross section, the widest face transversely to the longitudinal direction of the first type blade elements 9 realizing the impact surface 10.

The second type blade elements 12 comprise a substantially orthogonally trapezoidal cross section, the widest of the faces (surface areas) parallel to one another of the second type blade element 12 realizing the impact surface 13.

The face 14, which is perpendicular to the two surface areas of the second type blade element 12, points toward the rotational axis 5 of the drum 6, that is to say, when looked at radially, is at a smaller distance from the rotational axis 5 than the other face 15 which is not perpendicular (that is to say is inclined) to the two surface areas of the second type blade elements 12.

The angular distance $\alpha$ between a plane that is defined by the impact surface 9 and a radius of the drum 6 which runs through the center of gravity of the first type blade element 9, is approximately between 0° and 10°.

The angular distance $\beta$ between a plane that is defined by the blade surface 13 and a radius of the drum 6 which extends substantially normally to the inclined face 15 of the second type blade element 12, is approximately between 40° and 60°.

The first type blade elements 9 and the second type blade elements 12 are arranged in such a manner that the impact surface 9 and blade surface 13 are each facing the rotational axis.

The number of first type blade elements 9 corresponds to the number of second type blade elements 12. In this case, there are in each case 27 first or second type blade elements with a diameter of the drum of 500 mm.

The drum 6, as can be seen from FIG. 5, is substantially surrounded in a circumferential manner by a wall 11 of a housing 2.

In a preferred manner, the gap width 16 between the wall 11 and the outermost dimension of the end part 7 is between 1 mm and 10 mm.

In a preferred manner, the smallest radial distance 17 between the wall 11 and the inclined face 15 is between 10 mm and 15 mm.

A wiper element 18, which, in a preferred manner, extends along the entire axial length of the drum 6, is arranged in the region of the inlet opening 3.

The wiper element 18 is preferably arranged in such a manner that the radial gap width between the wiper element 16 and the second type blade element 12 is between 1 mm and 3 mm.

A wiper element 19, which, in a preferred manner, extends along the entire axial length of the drum 6, is also arranged in the region of the outlet opening 4.

The wiper element 19 is also preferably arranged in such a manner that the radial gap width between the wiper element 19 and the second type blade element is between 1 mm and 3 mm.

In a preferred, manner, the inlet opening 3 is arranged in such a manner that the angular distance ϵ, which cuts out the arc portion of the wall 11 which exposes the inlet opening 3, is between 35° and 50°.

In a preferred manner, the outlet opening 4 is arranged in such a manner that the angular distance ζ, which cuts out the arc portion of the wall 11 which exposes the outlet, opening 4, is between 40° and 55°.

The inlet opening 3 and the outlet opening 4 are arranged, in this case, with respect to one another in such a manner that the angular distance η is between 155° and 170°.

Consequently, the product is moved through the device 1 in a substantially deflection-free manner.

A particular embodiment of the device 1 can be seen from FIG. 6. The drum 6 is flange-mounted on a motor 20 by means of a hub arrangement 21 which is designated schematically by the reference 21.

It can be seen from FIGS. 1 and 6 that the drum 6 is mounted in an overhung manner only on the end part 8 that is arranged on the motor side.

However, it can be provided, depending on the axial length and/or diameter of the drum 6, that a bearing arrangement is also effected on the end part 7 which is not arranged on the motor side.

A shaft or axis, which extends over the entire axial length of the arum 6, can also be used for the bearing arrangement of the end part 1.

Reinforcing elements 22, which are realized as circular ring-shaped disks and are connected to the first type blade elements 9 and to the second type blade elements 12, are additionally provided.

The reinforcing elements 22 increase the stability of the drum 6, reduce the vibrations generated during operation and prevent the blade elements 9 and 12 from, bending and, as a result, the diameter of the drum 6 from widening in a radial manner on account of centrifugal forces.

The invention claimed is:

1. An impact device for inactivation of insects in a pourable feedstuff or foodstuff product without significantly altering a grain size distribution of the product, said impact device having a housing which comprises respectively at least one inlet opening and one outlet opening for the product to be treated, and a drum which is arranged in the housing so as to be rotatable about a rotational axis,
   wherein a plurality of first type blade elements, which extend approximately parallel to the rotational axis and have an impact surface, are arranged between two end parts of the drum,
   a plurality of second type blade elements, which extend approximately parallel to the rotational axis and have a blade face, are arranged between the end parts of the drum,
   the blade face of the second type blade elements is inclined between 15° and 75° with reference to the radius of the drum, and
   the drum is surrounded, in part, circumferentially by a wall of the housing, and the at least one inlet opening and the at least one outlet opening are both formed at spaced apart circumferential regions of the wall surrounding the drum.

2. The device as claimed in claim 1, wherein the at least one inlet opening and the at least one outlet opening are arranged offset to one another with reference to the rotational axis by more than 90° and less than 270°.

3. The device as claimed in claim 1, wherein the first type blade elements comprise a substantially flat impact surface with a width of between 5 mm and 25 mm and a substantially rectangular cross section.

4. The device as claimed in claim 1, wherein the impact surface of the first type blade elements is inclined between 0° and 45° with reference to a radius of the drum.

5. The device as claimed in claim 1, wherein the first type blade elements are arranged radially at substantially identical spacings with reference to the rotational axis.

6. The device as claimed in claim 1, wherein adjacent first type blade elements are arranged at substantially identical spacings from one another.

7. The device as claimed in claim 1, wherein the blade face of second type blade elements is substantially flat with a width of between 5 mm and 25 mm and the second type blade elements comprise an inclined face, and the blade face and the inclined face meet at an edge.

8. The device as claimed in claim 1, wherein the second type blade elements are arranged radially at substantially identical spacings with reference to the rotational axis.

9. The device as claimed in claim 1, wherein the first type blade elements and the second type blade elements are arranged in each case alternately in a circumferential direction of the drum.

10. The device as claimed in claim 1, wherein the second type blade elements are situated radially outside the first type blade elements with reference to the rotational axis.

11. The device as claimed in claim 10, wherein in a region of the at least one of the at least one inlet opening and the at least one outlet opening the wall comprises at least one wiper element, a radial gap width, with reference to the rotational axis, between the at least one wiper element and the second type blade elements is between 0.5 mm and 5 mm.

12. A method for inactivation of insects in a pourable feedstuff or foodstuff product without significantly altering a grain size distribution of the product, wherein said method includes the following step:
   circumferential feeding of the product to be treated to a drum which rotates about a rotational axis and is provided with a plurality of first type blade elements, the plurality of first type blade elements extend approximately parallel to the rotational axis, have an impact surface and are arranged between two end parts of the drum, and
   further providing the drum with a plurality of second type blade elements, which extend approximately parallel to the rotational axis, have a blade face and are arranged between the end parts of the drum, and the blade face of the second type blade elements is inclined between 15 and 75 with reference to the radius of the drum, said circumferential feeding being in a substantially radial direction with respect to the rotational axis of the drum; and
   circumferentially removing the product, treated by the drum, at a circumferential location which is spaced from the circumferential feeding of the product to be treated.

13. An impact device for inactivation of insects in a pourable feedstuff or foodstuff product, said impact device having a housing which comprises respectively at least one inlet opening and one outlet opening for the product to be treated, and a drum which is arranged in the housing so as to be rotatable about a rotational axis, wherein a plurality of first type blade elements, which extend approximately parallel to the rotational axis and have an impact surface, are arranged between two end parts of the drum, and the drum is surrounded in part circumferentially by a wall of the housing and the at least one net opening and the at least one outlet opening are realized in the wall;

a plurality of second type blade elements, which extend approximately parallel to the rotational axis, are arranged between the end parts of the drum; and the blade face of the second type blade elements is inclined between 15° and 75° with reference to a radius of the drum.

* * * * *